I. HINERFELD.
ENVELOP SEALING AND STAMPING MACHINE.
APPLICATION FILED APR. 21, 1919.

1,348,493. Patented Aug. 3, 1920.
6 SHEETS—SHEET 1.

INVENTOR
Irving Hinerfeld.
BY
Jas. H. Griffin
ATTORNEY

I. HINERFELD.
ENVELOP SEALING AND STAMPING MACHINE.
APPLICATION FILED APR. 21, 1919.

1,348,493.

Patented Aug. 3, 1920.
6 SHEETS—SHEET 3.

INVENTOR
Irving Hinerfeld
BY
Jas. H. Griffin
ATTORNEY

I. HINERFELD.
ENVELOP SEALING AND STAMPING MACHINE.
APPLICATION FILED APR. 21, 1919.

1,348,493.

Patented Aug. 3, 1920.
6 SHEETS—SHEET 4.

INVENTOR
Irving Hinerfeld.
BY
Jas. H. Griffin
ATTORNEY

I. HINERFELD.
ENVELOP SEALING AND STAMPING MACHINE.
APPLICATION FILED APR. 21, 1919.

1,348,493.

Patented Aug. 3, 1920.
6 SHEETS—SHEET 5.

INVENTOR
Irving Hinerfeld.
BY
Jas. H. Griffin
ATTORNEY

I. HINERFELD.
ENVELOP SEALING AND STAMPING MACHINE.
APPLICATION FILED APR. 21, 1919.

1,348,493.

Patented Aug. 3, 1920.
6 SHEETS—SHEET 6.

INVENTOR
Irving Hinerfeld.
BY
Jas. H. Griffin
ATTORNEY

UNITED STATES PATENT OFFICE.

IRVING HINERFELD, OF NEW YORK, N. Y.

ENVELOP SEALING AND STAMPING MACHINE.

1,348,493.

Specification of Letters Patent.  Patented Aug. 3, 1920.

Application filed April 21, 1919. Serial No. 291,694.

*To all whom it may concern:*

Be it known that I, IRVING HINERFELD, a citizen of the United States, residing in the city of New York, county of the Bronx, and State of New York, have invented a certain new and useful Envelop Sealing and Stamping Machine, of which the following is a specification.

This invention is a machine for sealing and stamping envelops, and the object of the invention is to provide a machine wherein these two distinct operations, necessary to the preparation of letters for mailing, may be accomplished by the same machine and substantially simultaneously.

In the present invention, the machine is so constructed that envelops of a large variety of sizes can be positioned in the machine, and be operated upon through a single manual operation, preferably through the operation of a crank, so that while the envelop lies in one position, the flap of the envelop is moistened and pasted down and simultaneously a stamp is moistened, brought into coöperative relation to the envelop, and automatically adhesively secured thereto.

The invention of the present application is not only operable to seal and stamp envelops of widely varying sizes, but is preferably so constructed as to automatically compensate for envelops of varying thickness due to the presence of more or less bulky matter inclosed within the envelop.

In the preferred embodiment of the invention the envelops are manually, individually, fed to the machine for the sealing and stamping operations, and are thereafter manually removed therefrom, although, if desired, such envelops may be fed from a hopper, and suitably ejected through the machine automatically at the conclusion of the sealing and stamping operations.

Features of the invention other than those specified will be apparent from the hereinafter detailed description taken in conjunction with the accompanying drawings.

In the accompanying drawings I have illustrated one practical embodiment of the invention, but the construction therein shown is to be understood as illustrative only, and not as defining the limits of the invention.

Fig. 7ª is a section on the line 7ª 7ª of Fig. 7.

Referring to the drawings, 1 designates the base on which the machine is built. Mounted in upstanding relation near either end of the base are a pair of plates 2, which are rigid with the base at their lower ends and are spaced apart near their upper edges by a spacing or tie-rod 3, which maintains the plates in spaced relation so that they form a frame on which the operating parts of the machine are mounted. Extending transversely of the machine between the plates 2, and rigidly secured at its opposite ends to such plates, is an inclined table 4, adapted to support the envelop to be sealed and stamped. Positioned above the table 4 is a mechanism for sealing the envelop, while positioned below said table is a mechanism for applying the stamp to the envelop.

In practice, plates 5 are positioned exteriorly of the plates 2 and form the ends of the machine housing, the back of the machine is closed by a plate 6, and the top and front of the machine are inclosed by plates 7, 8 and 9, so that the machine is completely housed within a suitable casing which may be more or less ornamented for aesthetic reasons as will be understood.

The mechanism for sealing the envelop embodies means for moistening the gummed flap thereof, means for thereafter folding the flap into sealed position, while the means for applying the stamp embodies mechanism for selectively positioning stamps of different denominations in operative relation with the envelop, cutting a stamp free from a magazine roll, moistening said stamp, and thereafter applying it to the envelop. The means for sealing the envelop will first be described.

Mounted at the rear edge of the table 4 is a plurality of tubular guides 10 rigid with the table and adapted to receive the stems 11 of hinges 12 (see Fig. 12) which are fixed to a padded plate 13. The plate 13 is normally maintained in the upstanding position shown in Figs. 3, 4, 5 and 12 by means of a spring 14, secured to an arm 15, rigid with the said plate. When the envelop $x$ is passed in through the slotted front of the machine and slid down the table 4, it is adapted to partake of the position shown in Fig. 3, wherein the gummed flap $x'$ of the envelop lies against the padded plate 13, and while in this position, the gummed face of said flap is adapted to be moistened by a padded plate 16. This padded plate 16 is mounted upon a pair of trunnions 17 which engage with slots 18 in the end of plates 2. The slots 18 lie in planes parallel to the plane of the table 4, and the padded plate 16 is adapted to be moved toward and away from the plate 13 while guided in its travel by the slots 18. In the lower portion of the machine is positioned a liquid containing reservoir 19, adapted to be charged through an inlet 20, and from this reservoir 19 to the padded plate 16 extends a flexible wick 21. Through well known laws of capillary, the liquid in the reservoir 19 works up through the wick 21 and keeps the pad of the plate 16 moistened, so that when this pad is brought into engagement with the gummed flap $x'$ of an envelop, lying against the padded plate 13, it will sufficiently moisten said flap to condition it to be pasted down on the envelop. The folding of the flap to adhesively secure it to the envelop is accomplished through pivotal movement of the padded plate 13 from the positions shown in Figs. 5 and 12 to those of Figs. 6 and 13.

The stamps which are to be applied to the envelop are preferably placed in the machine in the form of rolls Y and Y'. The roll Y is composed of a number of stamps $y$ of one denomination, and the roll Y' is composed of a number of stamps $y'$ of a different denomination. As shown, the stamps are rolled with the gummed side of the roll out, but, if desired, the construction might be inverted, and the gummed side be rolled in. Various forms of mechanism may be employed for supporting the stamp rolls, but as here shown, they are carried on pins 22 and 23, carried by a bracket 24, rigid with the front plate 9 of the casing. Positioned adjacent the inner side of the plate 9 are a pair of rolls 25 and 26 having an intermediate roller 27. The rolls 25 and 26 are journaled in hangers 28 which depend from the under side of the table 4, and the shafts of said rolls are geared together through gears 29 and 30, so that they will rotate in opposite directions. The roller 27 is of a less diameter than the distance between the rolls 25 and 26, and is journaled for rotation in a bracket 31, adapted to be reciprocated longitudinally of the hangers 28, to bring the roller 27 into engagement with either of the rolls 25 or 26. The roller 27 is normally maintained in engagement with the roll 26 by means of a spring 32, but said roller 27 may be brought into engagement with the roll 25 through the manipulation of a cam 33 which engages with the bottom of the bracket 31, and is rigid with a handle 34, positioned exteriorly of the casing.

The stamps $y$ are adapted to be uncurled from the roll Y, passed through a slot in the casing plate 9 and between the rolls 25 and 27, while the stamps $y'$ of the roll Y', pass through the slot in the casing and between rolls 26 and 27. By this arrangement the feed of either strip of stamps between the rollers is made dependent upon the position of the intermediate roller 27. If the roller 27 is raised, the turning of the rollers will feed the stamps $y$, whereas, if it is lowered, it will feed the stamps $y'$. In this way, stamps of either denomination may be fed into the machine when the gears 29 and 30 are actuated by means hereinafter described.

Figures 7, 7A, 8, 9, 10:
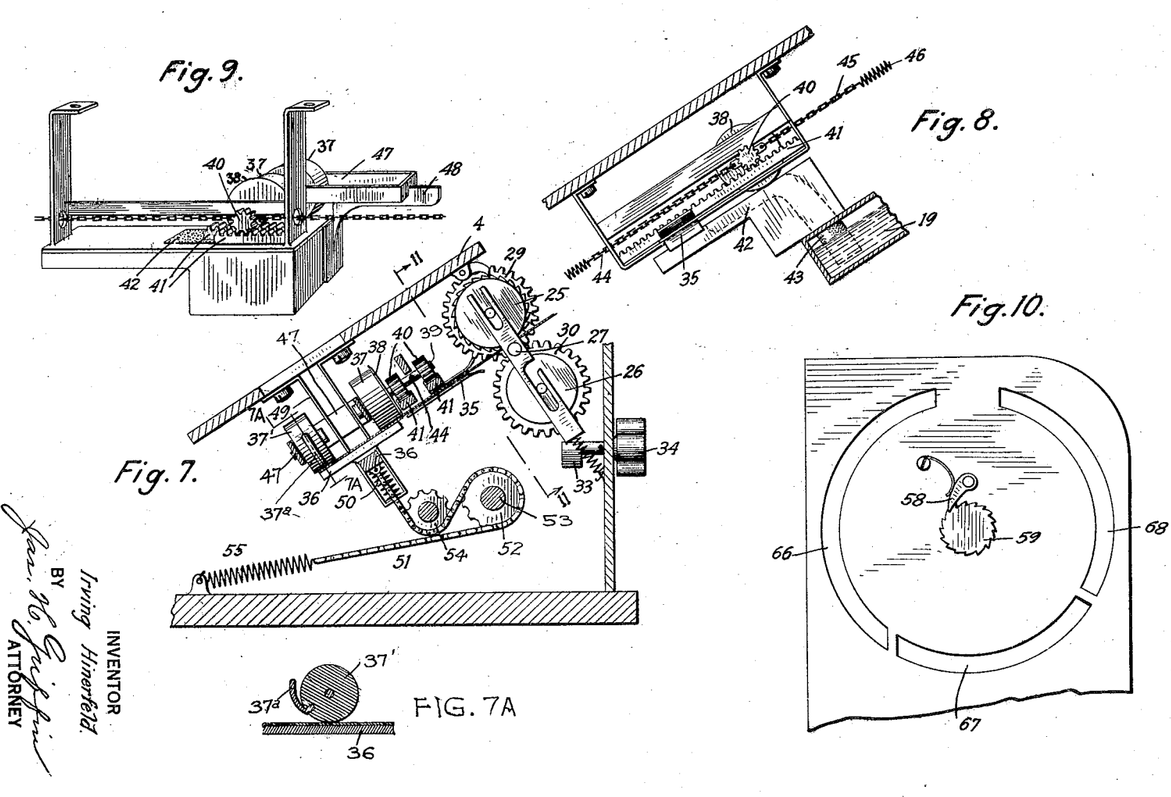
Fig. 7 is a true detail fragmental section taken on the line 3—3 of Fig. 2.
Fig. 8 is a front view of the parts shown in Fig. 7.
Fig. 9 is a detail perspective of the operating parts illustrated in Fig. 8.
Fig. 10 is a section on the line 10—10 of Fig. 2.

The strip of stamps fed by the rollers, as described, passes through a guide channel 35, (see Figs. 7 and 8) and on to an elevator 36 during the feeding operation, and, while in this position, is adapted to be traversed by a pair of moistening rolls 37, 37' associated with the former of which is a knife 38, whereby the stamp to be presently applied to the envelop is cut from the strip and duly moistened. The rolls 37 and 37' are padded or of felt and normally rest on the damp surface 42 to which moisture is applied from the reservoir 19 through a wick 43. The roll 37 is loosely mounted on a shaft 39 on which are also affixed a pair of pinions 40 meshing with racks 41. On this shaft is fixed a knife 38 which is of the sharp edge disk type and is adapted to be rotated by said shaft through the coöperation of the racks and pinions referred to. Also loosely mounted on the shaft 39 is one arm of a yoke 47, the other arm of which carries the other roll 37'. If desired this roll may be mounted to loosely roll over the moist surface, but, as shown, it is fixed against rotation so as to slide lightly thereover. The yoke is precluded from twisting on the shaft 39, during the forward and backward movement of which it is adapted to partake, by providing said yoke with a sliding connection with a rigid guide 48 as shown best in Fig. 9. A chain or other flexible connection 44 serves to draw the knife and rolls in one direction through means hereinafter described, while its return movement is effected through the flexible connection 45 with which is associated a spring 46. The normal position of the parts is as shown in Figs. 8 and 9, and these positions prevail at the time the stamp roll is fed into a position wherein the foremost stamp will lie upon the elevator 36. If the connection 44 is now operated, the shaft 39 and yoke 47 will be drawn to the left in Figs. 8 and 9, thereby causing the rollers 37 to traverse the stamp and moisten the same, while the knife 38 cuts the stamp from the strip. During this operation, the roll 37 is rolled over the stamp, the roller 37' slides lightly thereover without turning, and the cutter is rotated by the pinions 40 and rack 41. The stamp is thus cut from the strip and is ready to be applied to the envelope. As soon as the tension on the connection 44 is released, the spring 46 immediately returns the parts to the positions of Figs. 8 and 9. During the return of the parts as described, the stamp is precluded from being drawn off of elevator 36, because the edge of the stamp, if it endeavored to slide off of the platform would be engaged by the guide 49 as shown in Fig. 7 and as the roll 37 rolls lightly over the stamp and the roll 37' slides lightly thereover there is not the slightest tendency to move the stamp as described. Moreover, the stamp is precluded from clinging to the rolls and being coiled up thereon by the joint rolling and sliding action of said rolls and, moreover, by a little wire projection 37ª preferably mounted on the roll 37' as shown in Fig. 7ª. There is not the slightest tendency for the stamp to cling to the roll 37' and any tendency which it may have to cling to the roll 37 is precluded by the projection 37ª which serves to free it from the roll 37.

The elevator 36 is mounted for movement toward and away from the table 4 in guides 49 depending from said table. One guide is positioned at each side of the elevator 36 and said elevator is provided with ears 36' at each side thereof. These ears move between the guides during the raising and lowering of the elevator. Springs 50 normally tend to lift the elevator into the position of Fig. 6, wherein its top face will be flush with the top of the table, but this tendency of the spring is normally counteracted by a flexible connection 51, which normally holds the elevator in a position to receive a stamp introduced into the machine as described. The connection 51 is preferably in the form of a sprocket chain which is secured to the elevator, passed over an idler 54, and into engagement with a sprocket 52, mounted on a shaft 53, extending transversely of the machine. From the sprocket 52 the chain 51 extends to and is secured to a spring 55, the other end of which is fastened to the base of the machine. The raising of the elevator under the impulse of the springs 50 is thus rendered conditional upon the rotation of the shaft 53, and this shaft is so controlled, through operative connections with the actuating mechanism hereinafter more fully described, that at the time when the padded plate 13 is folding down the gummed flap of the envelop to seal the same, the elevator is simultaneously raising, carrying a stamp therewith, so that as the envelop is sealed, the elevator forces the previously moistened and cut stamp against the face of the envelop and adhesively secures it thereto. As stated, the rotation of the shaft 53 in one direction brings about the sealing of the envelop, and the applying of the stamp, and, conversely, its movement in the opposite direction releases the envelop from the padded plate 13 and again depresses the elevator to its normal position in the path of the incoming stamps.

Having specifically described the elements which directly operate upon the envelop to seal the same, as well as the structural elements which operate directly upon the stamp to apply it to the envelop, I will now proceed to describe the power mechanism whereby these operations are carried out in logical sequence to fulfil their functions in the single operation of a crank.

Figure 2:
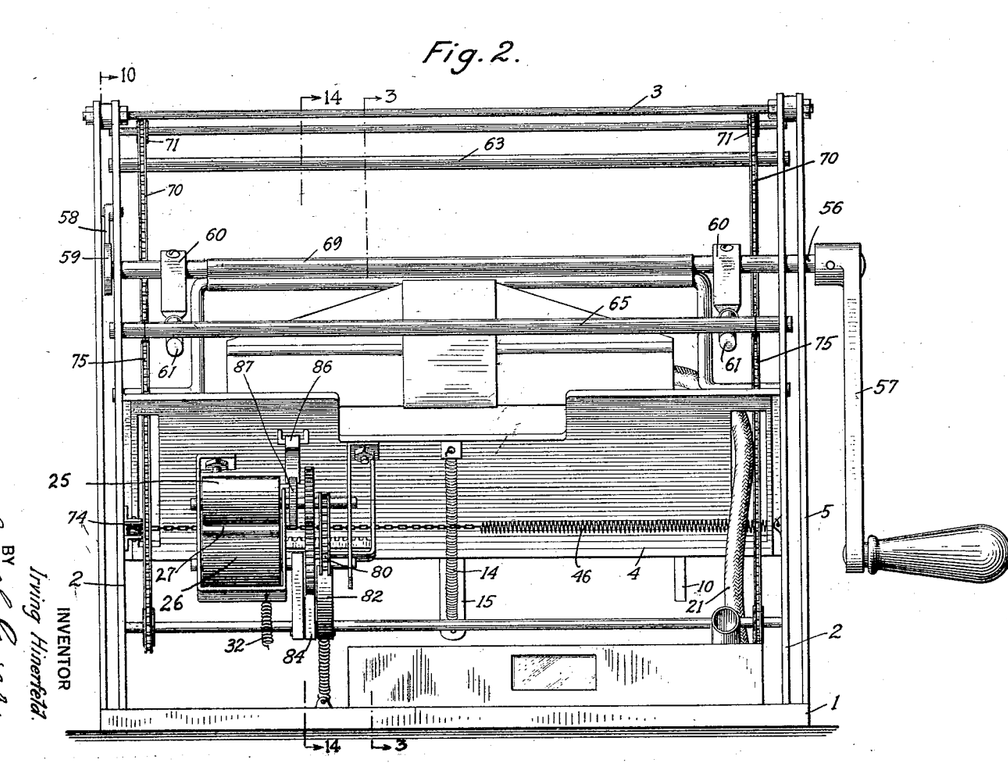
Fig. 2 is a front elevation of a machine with the housing or casing removed.

Extending longitudinally of the machine and journaled for rotation in the end plates 2 is a shaft 56 adapted to be rotated through the manipulation of a crank 57 fixed to one end thereof exteriorly of the housing plate 5. Rotation to the shaft 56 is adapted to be imparted by the crank 57 in a counterclockwise direction, as viewed in Figs. 3 to 6, and retrograde movement of this shaft is precluded by means of a dog or pawl 58 adapted to engage with a ratchet wheel 59 fixed on the shaft, as shown in Figs. 2 and 10. Mounted on the shaft, and fixed against relative circumferential movement thereon are a pair of sockets 60, carrying spring pressed plungers 61, the springs being positioned within the sockets and serving to normally force the plungers in an outward direction. Said plungers are, however, precluded from disengagement with the sockets by pins 62 which work in slots in the sides of the sockets. As the shaft 56 is rotated, the plungers are adapted to move in an arcuate path, and successively engage with means for operating the envelop sealing and stamping mechanisms. This means is embodied in a plurality of rods 63, 64 and 65 which extend transversely of the machine and are guided for their operations in slots 66, 67 and 68, respectively, formed in the end plates 2. The rods 63 and 65 extend directly across the machine, but the rod 64 is bent in the form of a crank so that it will lie out of the path of travel of the moistening plate 16. In order to preclude rod 64 from fouling this plate, it is loosely bound to the shaft 56 by a sleeve 69, as shown best in Fig. 2.

To the rod 63 is attached one end of each of a pair of flexible connections 70, here shown in the form of sprocket chains, which extend upwardly and over directional sprockets 71, thence downwardly around directional sprockets 72, whence they extend directly to, and are secured to, the trunnions 17, which carry the moistening plate 16. To one end of the rod 64 is secured one end of the flexible connection 44 which passes over directional pulleys 73 and 74, and is connected at its opposite end to the shaft 39, which carries the rolls 37 and 37' and the knife 38, (see Figs. 2, 3, 5 and 8). To the opposite ends of the rod 65 is secured one end of each of a pair of flexible connections 75, here shown as sprocket chains. The chains 75 extend downwardly, pass around sprockets 76 fixed on the shaft 53, and thence extend directly to, and are secured to, the padded plate 13, (see Figs. 3–6).

Figure 14:
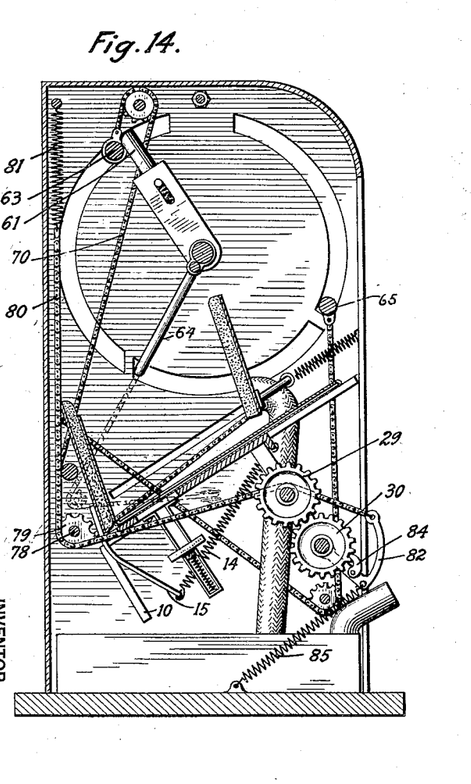
Fig. 14 is a section on the line 14—14 of Fig. 2.

The directional sprockets 72, around which the chains 70 pass before being secured to the trunnions of the moistening plate 16, are fixed on a shaft 78 which extends between the end plates 2, and on this same shaft is fixed another sprocket 79, shown in Fig. 14. About this sprocket 79 passes a chain 80, one end of which is secured, through a spring 81, to the top of the casing as shown, and the other end of which is secured to a rocker 82. The rocker is pivoted on the shaft which carries the stamp advancing roll 26, and gear 30. A pawl 84 is pivoted to the rocker 82 and is adapted to coöperate with the gear 30, while a spring 85 serves to normally hold the rocker in depressed or detracted position. Through this mechanism, step by step advancing movement of the rolls 25 and 26 is accomplished, while retrograde rotation of said rolls is precluded by a gravity pawl 86, which normally gravitates into engagement with the ratchet wheel 87, fixed on the shaft which carries the roller 25, (see Figs. 2, 11 and 14). The operation of the machine in the carrying out of its functions will now be described.

Figures 1, 11:
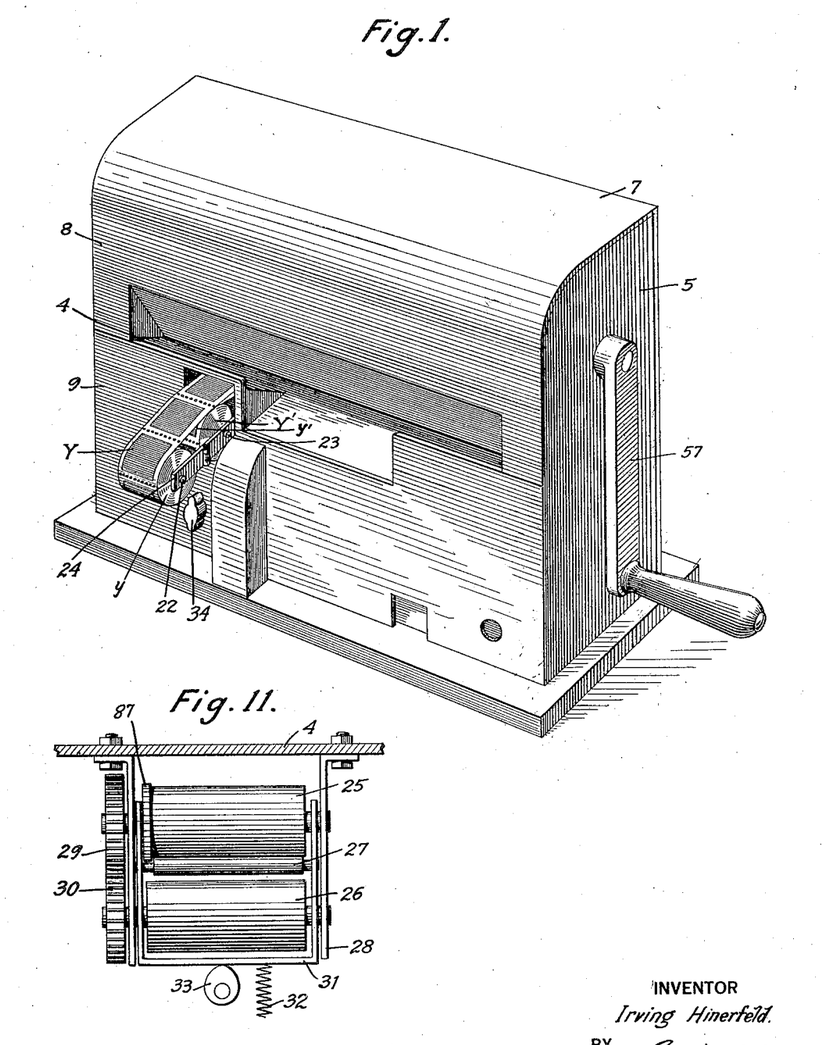
Figure 1 is a perspective view of a machine embodying the present invention.
Fig. 11 is a section on the line 11—11 of Fig. 7 illustrating certain stamp feeding means employed.
Figure 3:
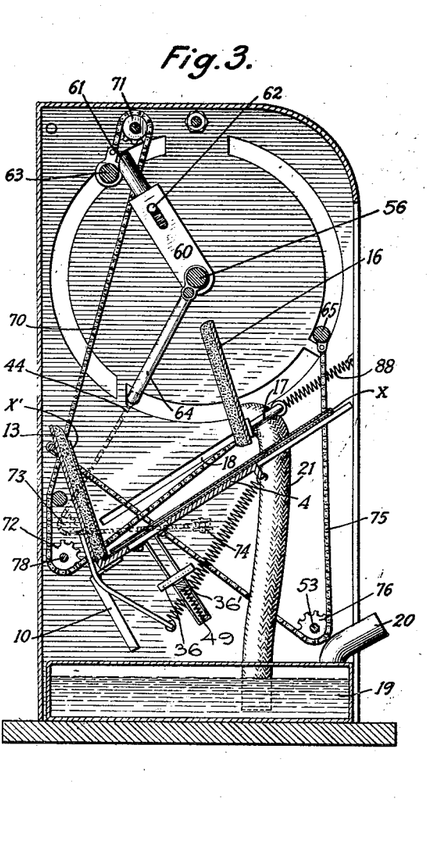
Figs. 3, 4, 5 and 6 are transverse sections taken substantially in the plane of line 3—3 of Fig. 2, showing the parts of the machine in different operative positions; in these figures certain operating parts are omitted in the interest of clearness.
Figure 4:
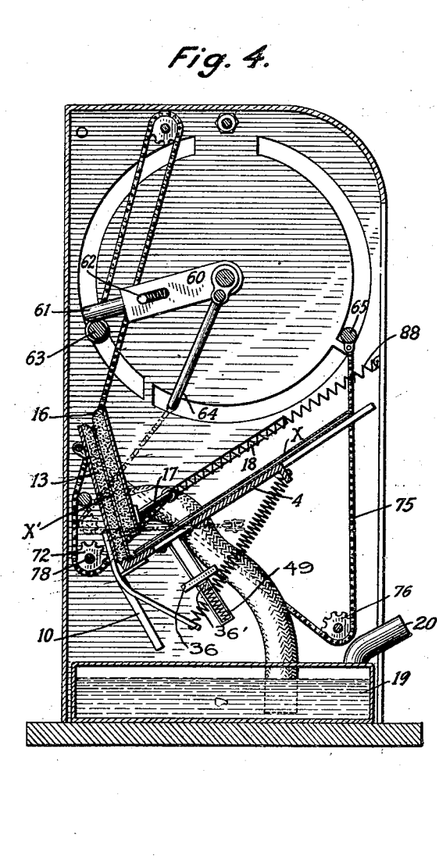

As shown in Fig. 1, the front of the casing is suitably shaped to allow of the ready insertion of an envelop into the machine in such position that when inserted it will lie upon the inclined table 4, in the position shown in Fig. 3. The parts of the machine at this time are as shown in this figure, and it will be noted that the flap $x'$ of the envelop $x$ rests against the padded plate 13. The operator grasps the crank 57 and rotates the same. During the initial resulting movement of the shaft 56, the spring pressed plungers 61 engage with the rod 63, whereupon further movement of the crank causes said rod to be forced downwardly through its guide slots 66 drawing thereafter the chains 70. The chains 70 are drawn over the sprockets 71 and 72, rotate the shaft 78, and cause the padded plate 16, which is moistened by the wick 21 from the reservoir 19, to be brought into engagement with the gummed flap of the envelop for the purpose of moistening the same. The parts are moved through this operation from the positions of Fig. 3 to those of Fig. 4, and further operation of the crank cannot force the rod 63 farther down as the plate 16 is not adapted for further movement. Accordingly, the force on the handle becomes greater than the force of the springs behind the plungers 61, and these plungers slip off of the rod 63 and pass thereby. Immediately the rod 63 is released, a pair of springs 88, which are secured to the trunnions 17 of plate 16, retract the plate 16 to its initial position.

During the movement of the plate 16 toward and away from the plate 13, the shaft 78 is rotated first in one direction, and then in the reverse direction, and during this rotation of the shaft, through the sprockets 72, said shaft is caused to also rotate the sprocket 79, (see Fig. 14). Rotation of the sprocket 79 brings about an operation of the chain 80 which first oscillates the rocker 82 in a counter-clockwise direction from the position shown in Fig. 14 for the purpose of advancing the rolls to feed either one of the stamp strips in accordance with the position of the cam 33, (see Figs. 7 and 11). This is accomplished during the movement of the plate 16 toward the plate 13, and when this operation is reversed, the rocker 82 returns through oscillation in a counter-clockwise direction to the position in which it is shown in Fig. 14. The spring 81 takes up the slack in the chain 80 during these operations. The flap of the envelop having been moistened and the stamp advanced, the plungers 61 proceed along a circular path, engage with the rod 64, and move it from the position of Fig. 4 to the position of Fig. 5. This movement of the rod 64 actuates the flexible connection 44, which, as shown in Figs. 2, 8 and 9, is secured to the shaft which carries the stamp moistening rolls 37 and 37' and the cutting knife 38, so that as a result of this operation, the stamp is moistened and cut from the strip. After the rod 64 has been moved to the position of Fig. 5, the plungers 61 automatically release it and it returns to its initial position, the spring 46 of Figs. 2 and 8 serving to return the rollers and cutting knife free from engagement with the stamp.

Figure 5:
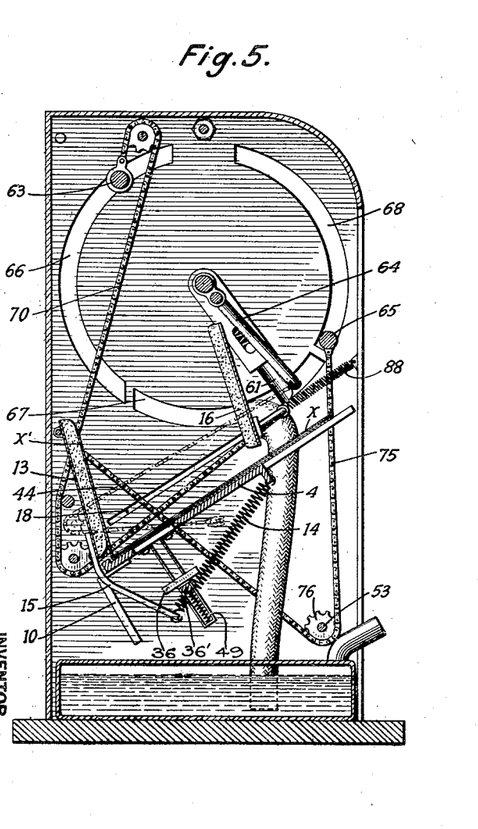
Figure 6:
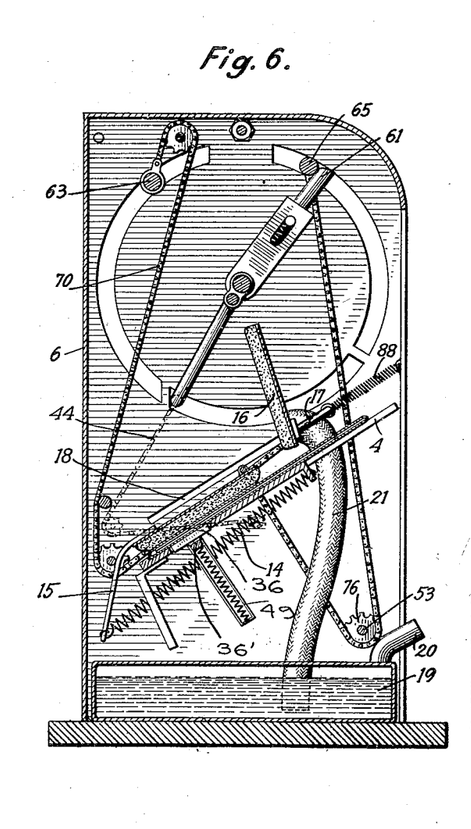

The plungers 61 proceed and next engage with the rod 65, and move it from the position of Fig. 5 to that of Fig. 6 before releasing it. The result of such movement is to cause the chains 75 to fold down the plate 13 into the position of Fig. 6, thereby folding down the flap of the envelop and adhesively securing it to the body of such envelop. The rotation of the gear 76, which acts as an idler for the chains 75, causes rotation of the shaft 53, which, as shown in Fig. 7, also carries a sprocket 52 engaging with a chain 51. Through the rotation of the sprocket 52, the elevator 36 is caused to rise by tension of springs 50 and apply a stamp, which has previously been cut and moistened, to the envelop simultaneously with the folding down of the flap thereof by the padded plate 13. During the return of the plate 13 from the position of Fig. 6 to its normal position of Fig. 5, the operations of the elevator are reversed, and said elevator is returned to its normal position of Fig. 7.

The plungers 61 having slipped by the rod 65 partake of the position shown in Fig. 3, the sealing and stamping operation on the envelop is completed, and the envelop may be withdrawn from the machine to undergo the next cycle of operations identical with those described.

In practice, the machine is preferably made of sufficient width to receive relatively large envelops, although this does not, in the least, preclude its efficient operation on much smaller ones, since, manifestly, any envelop smaller than the maximum size may be sealed and stamped by the machine by merely exercising sufficient care to see that the envelop is positioned adjacent the stamping end of the machine so that when the stamp is applied it will be placed on the envelop.

While it is the function of this machine to simultaneously seal and stamp envelops, it will be manifest that the machine might be employed to seal without stamping by simply removing the stamp rolls, or to stamp without sealing by merely tucking in the flaps of the envelops into the bodies thereof before inserting them into the machine. The latter may be practised when envelops are to be mailed with reduced postage.

Figures 12, 13:
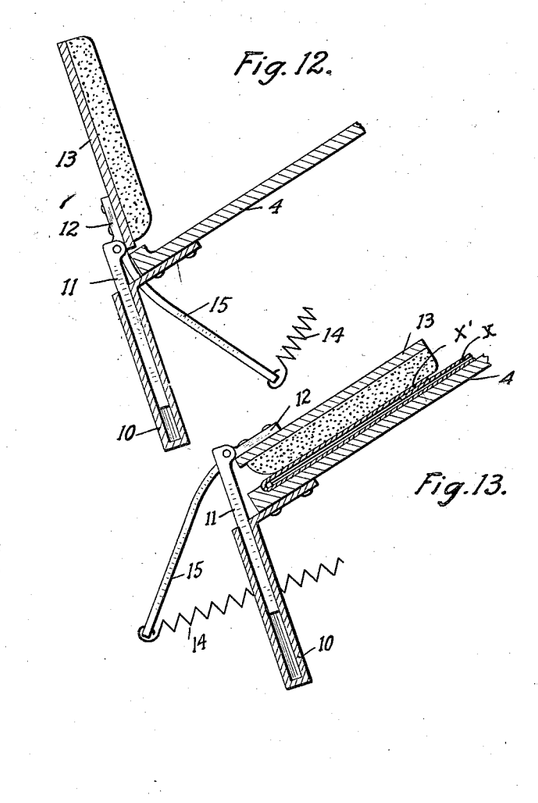
Figs. 12 and 13 are detail views of a hinged connection in the folding mechanism, the parts being shown in different operative positions.

An important practical advantage in a machine of this invention lies in the fact that bulky inclosures positioned within an envelop will not preclude the efficient operation of the machine which is so constructed as to automatically compensate for envelops of varying thicknesses. The means for accomplishing this automatic adjustment is shown in Figs. 12 and 13 wherein one leaf of each of the hinges 12 is slidable in a socket 10, so that when the padded plate 13 is folded down, as shown in Fig. 13, it is free to conform to the envelop through the sliding of the stems 11 in said sockets.

Having thus fully described the invention, what I claim as new, and desire to secure by Letters Patent, is:

1. Mechanism of the character described embodying means for sealing and stamping an envelop, means for selectively feeding strips of stamps into a position to be applied to the envelop, and means for severing the stamp to be applied from the strip of which it forms a part, and simultaneously moistening said stamp.

2. Mechanism of the character described embodying means for sealing and stamping an envelop, means for selectively feeding one of a plurality of strips of stamps of different denominations into a position to be applied to the envelop, and means for severing the stamp to be applied from a strip of which it forms a part and simultaneously moistening said stamp.

3. Mechanism of the character described embodying means for sealing and stamping an envelop, means for feeding a strip of stamps to bring the foremost stamp into position to be applied to the envelope, means for applying said foremost stamp to the envelope, means independent of the stamp applying means, for severing said stamp from the strip, and moistening said stamp while it is being severed from the strip.

4. Mechanism of the character described embodying means for sealing and stamping an envelop, means for feeding a strip of stamps to place the foremost stamp of the strip in a position to be applied to the envelop, a rotary knife for severing the stamp from the strip, a stamp applying member movable toward and away from the envelop and on which stamp applying member a stamp severed from the strip is deposited, means for moistening the severed stamp, and means for actuating the stamp applying member to affix the stamp to the envelop.

5. Mechanism of the character described embodying means for sealing and stamping an envelop, means for feeding a strip of stamps to place the foremost stamp of the strip in a position to be applied to the envelop, means for moistening the stamp, a rotary cutter for severing it from the strip of which it normally forms a part, and means for applying the severed and moistened stamp to the envelop.

6. Mechanism of the character described, embodying means for sealing and stamping an envelop, means for feeding a strip of stamps to place the foremost stamp of the strip in a position to be affixed to the envelop, stamp moistening elements mounted to traverse said stamp for moistening the stamp and a rotary cutter coöperating with the moistening elements for severing the stamp from the strip of which it normally forms a part during the moistening of said stamp by said elements.

7. Mechanism of the character described, embodying means for sealing and stamping an envelop, means for applying a stamp to an envelop, means for feeding a strip of stamps to place the foremost stamp of the strip in operative relation with the stamp applying means, and means independent of the stamp applying means for severing the stamp to be applied from the strip and simultaneously moistening said stamp.

8. Mechanism of the character described, embodying means for sealing and stamping an envelop, means for applying a stamp to an envelop, means for feeding a strip of stamps to place the foremost stamp of the strip in operative relation with the stamp applying means, a rotary cutter for severing the foremost stamp from the strip, means for moistening the stamp thus severed, and means for actuating the stamp applying means to affix the moistened and severed stamp to the envelope.

9. In mechanism of the character described, means for moistening the flap of an envelop, means for folding down and sealing said flap, means for applying a stamp to the envelope, means for feeding a strip of stamps to place the foremost stamp of the strip in coöperative relation with the stamp applying means, means for severing the said foremost stamp from the strip, and means for moistening the stamp, in combination with a plurality of operating members positioned in an arcuate path, operative connections between the several operating members and the said several means, and a common concentrically operating prime mover adapted to actuate the operating members in succession to moisten and seal the envelop, and to cut off, moisten and apply the stamp thereto.

10. In mechanism of the character described, means for moistening the flap of an envelop, means for folding down and sealing said flap, means for applying a stamp to the envelop, means for feeding a strip of stamps to place the foremost stamp of the strip in coöperative relation with the stamp applying means, means for severing the said foremost stamp from the strip, and means for moistening the stamp, in combination with a plurality of operating members positioned in an arcuate path, operative connections between the several operating members and the said several means, a power shaft arranged coaxial with the operating members and radially projecting means on the shaft adapted to successively engage the operating members for the purpose of actuating the same, whereby an envelop is moistened and sealed and a stamp cut off, moistened and applied thereto.

11. Mechanism of the character described embodying means for guiding an envelop in the sealing and stamping position, means independent of the guiding means for moistening the flap of the envelope and means for pasting it down, in combination with means for feeding a stamp strip, means for moistening the foremost stamp of the strip, means for severing said stamp from the strip, and means for applying the stamp to the envelop.

12. Mechanism of the character described embodying means for guiding an envelop in the sealing and stamping position, means independent of the guiding means for moistening the flap of the envelop, a pivoted member, means for pivotally moving said member to fold down and seal the flap of the envelope, in combination with means for feeding a stamp strip, means for moistening the foremost stamp of the strip, means for severing said stamp from the strip, and means for applying the stamp to the envelop while the pivoted member is in folded down position on said envelop.

13. Mechanism of the character described embodying means for guiding an envelop in the sealing and stamping position, a moistening pad, means for shifting the moistening pad into and out of engagement with the gummed flap of the envelop to moisten the same, a pivoted member adapted to back up the flap during the moistening operation and means for subsequently pivotally moving said member to fold down and seal the flap, in combination with means for moistening and applying the stamp to the envelop while the pivoted member is in envelop sealing position.

14. Mechanism of the character described, embodying means for guiding an envelop into sealing and stamping position, a moistening pad movable toward and away from the gummed flap of the envelop to moisten said flap when brought in engagement therewith, and means for folding down and sealing said flap in combination with means for feeding a stamp strip, in a position to be applied to the envelop, in combination with means for severing a stamp from the strip, a moistening roller movable over the stamp to moisten the same and means for thereafter applying the stamp to the envelop.

In witness whereof I have signed my name to this specification.

IRVING HINERFELD.